No. 820,638. PATENTED MAY 15, 1906.
S. GÁBRIEL.
HEATING PRESERVES.
APPLICATION FILED JULY 10, 1905.
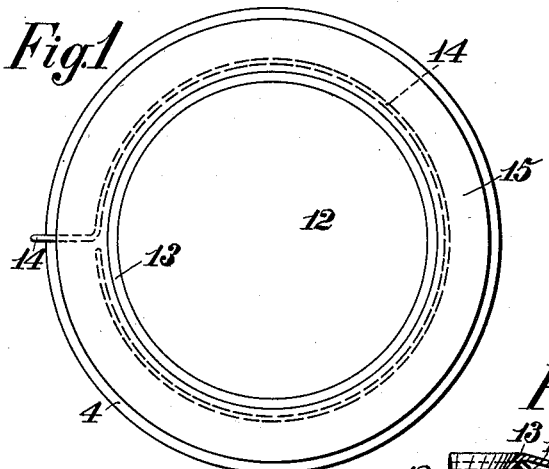
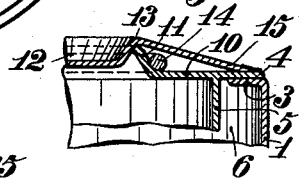
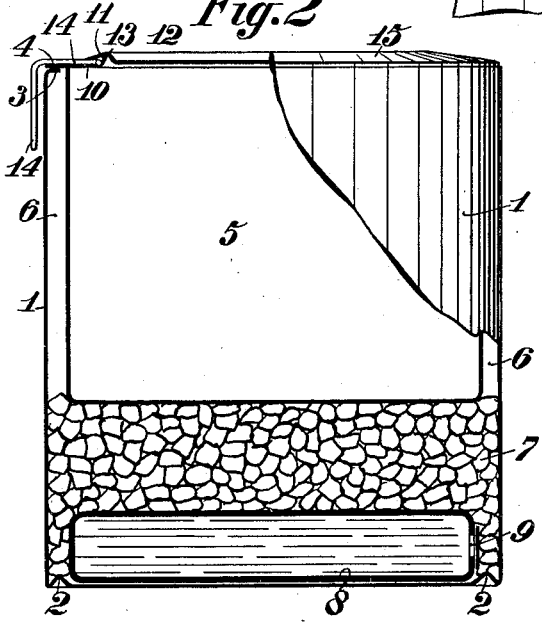
Witnesses:
Inventor:
Stefan Gábriel
by Curtis W. Hopkins
Attorney

UNITED STATES PATENT OFFICE.

STEFAN GÁBRIEL, OF BUDAPEST, AUSTRIA-HUNGARY, ASSIGNOR OF ONE-THIRD TO THE FIRM OF LEINER BROTHERS, OF UPJEST, AUSTRIA-HUNGARY, AND ONE-THIRD TO OTTO FRIEDMANN, OF BUDAPEST, AUSTRIA-HUNGARY.

HEATING PRESERVES.

No. 820,638.      Specification of Letters Patent.      Patented May 15, 1906.

Application filed July 10, 1905. Serial No. 269,054.

*To all whom it may concern:*

Be it known that I, STEFAN GÁBRIEL, a subject of the Emperor of Austria-Hungary, residing at Budapest, Austria-Hungary, have invented new and useful Improvements in Heating Preserves, of which the following is a full, clear, and exact description.

This invention relates to packing preserved or canned goods whereby they can be quickly heated to the temperature required without using any outside source of heat.

As is well known, canned meats and the like as made hitherto had to be heated on a fire or in a hot-water bath before they could be served. This is, however, disadvantageous for many reasons, as will be readily understood. For instance, goods intended for military purposes are not quite suitable for that reason, for it goes without saying that the soldier or the more or less large army does not always and at every place have available a fire or other source of heat, and in many cases, especially on outpost or scouting duty, it is not advisable to make fires, chiefly in order not to attract the attention of the enemy.

For tactical and many other reasons, which need not be enumerated here, such canned goods as those according to this invention are of the greatest importance, as they can be heated to the desired temperature without the use of any outside source of heat. This object is attained according to this invention by so packing the meat or other goods in boxes or tins that it becomes possible to produce in a few minutes an automatic heating of the contents of the tins, say by giving a blow with some hard object against one portion of the tin—for instance, in cylindrical tins against the bottom of it.

The packing-tin according to this invention is provided with two chambers separated from each other and from the atmospheric air in an air-tight manner, one serving to receive the food, while in the other chamber is placed a suitable agent or agents, which may be caused by a blow to undergo such a chemical reaction as to produce great heat. This heat then heats the preserved food in the other chamber in a few minutes, so that on opening the tin a sufficiently-heated food is available. The agents which produce this action are preferably constituted by water and burnt (unslaked) lime, which of course must be separated from each other until required for use in an entirely water-tight manner. For instance, the water is inclosed in a fluid-tight manner in a vessel made of some very fragile material—such, for instance, as thin glass—which rests against one of the walls of the tin in such manner that by a blow against this wall from the outside the glass vessel will be broken and the water escaping from it becomes mixed with the burnt lime and slakes it. The heat thus produced heats in this way the preserve tin or chamber.

The invention includes also for the purpose of obtaining the necessary air-tight closure the air-tight closing of the tin by the insertion of a wire soldered in, which enables the tin to be easily opened without injury to it by means of an ordinary key, so that the tin can be used several times.

The packing according to this invention is illustrated, by way of example, in the accompanying drawings, in which—

Figure 1 shows the closed tin in plan; Fig. 2, the same in vertical section, partly in side elevation; and Fig. 3 is a detail view on a larger scale.

In the construction shown in the drawings the tin is constituted by a cylindrical can 1, the bottom of which is provided with a circular recess 2. The can 1 is open at the top and has an inward circular flange 3. Into this can 1 is inserted and supported by its annular flange 4 a cylindrical tin 5 in such manner as to produce between the walls of the two tins an annular space 6 and between their bases a cylindrical space 7, communicating with the said space 6. The flange 4 of the tin 5 is soldered to the flange 3 of the can 1, so that the spaces 6 7 are made air-tight. Before the flanges are soldered together a vessel 8, made of some fragile material—for instance, of glass—is placed in this chamber, the glass being filled with water through an opening 9, which can be closed. It is inserted in such manner that it is held in position partly by the grooved part 2 and partly by pieces of burnt lime, which are placed upon and around it in a suitably-thick layer.

The tin 5, intended to receive the preserved food, is also open at the top and is provided with an inwardly-projecting annular flange 10, the inner end of which is slightly bent round at 11. To close the tin in an air-tight manner, a cover 12 is used, which is made to fit the edge 11 of the flange 10—that is to say, it engages the edge 11 with its bent portion 13. In the groove produced by the horizontal and inclined parts 10 11 is placed a ring 14, made of soft wire, one end of which projects under and out from the inclined edge 15 of the cover 12 and is bent downward in the manner indicated in Fig. 2. The edge 15 of the cover 12 is finally soft-soldered to the flange 4 of the tin, whereby the tin with the preserved food is closed in an air-tight manner.

In order to prevent the water from freezing, a little salt is added to it. It has been found that the most suitable solution is that containing ten per cent. of salt. The preferred proportion of weight of the solution of salt and of the burnt lime is about one to three. The volume of the annular space 6 is made such that it is sufficient to receive gases produced during the chemical reaction—that is to say, so that no excessive pressure could be produced which would burst the tin.

The pieces of lime used are advantageously too large to enter the annular space 6, which thus remains empty for the reception of the steam developed, so that the latter will be able to exercise its full effect upon the contents of the can.

In use a strong blow is made against the bottom of the tin with some hard object—for instance, with a hammer or bayonet—whereby the glass vessel 8 is broken, the solution of salt and water flows on the lime and slakes it. The heat generated rises in the space 6 and in a few minutes heats the food in the tin 5 to a sufficient extent, whereupon the tin can be opened. For this purpose the projecting end of the wire ring 14 is bent up horizontally, the key with its hole or opening is placed on the end of the wire, and by turning the key round the edge of the tin the wire is wound on the key, the said wire breaking the solder closing the cover in an air-tight manner, so that the cover can be easily removed.

As will be seen, the tin itself is not injured at all during the opening, so that it can be again used for fresh preserves.

The tins can of course be constructed and the various parts arranged in various ways without departing from the spirit of the invention.

What I claim, and desire to secure by Letters Patent, is—

1. In a self-heating canned-goods tin, the combination of an inner cylindrical receptacle and an outer one to inclose the same and leave an annular space around and a cylindrical space below it, the said spaces being air-tightly closed against the interior of the inner receptacle, means inclosed in the cylindrical space for generating heat when in contact with a liquid, a fragile sealed receptacle containing a liquid, and mounted within the said cylindrical space in proximity to the bottom and adapted to be broken to release the liquid when a sharp blow is directed against the bottom of the tin, so that the heating-space of the tin remains air-tightly closed during the development of the heat substantially as described.

2. In a self-heating canned-goods tin the combination of an inner receptacle for the goods, an outer receptacle to inclose the former and leave an annular space around the same and a cylindrical space below the bottom thereof, the said space being air-tightly closed against the interior of the inner receptacle, pieces of lime within the cylindrical space, too large in size to enter the annular space, a fragile sealed receptacle within the cylindrical space close to the bottom of the outer tin, said receptacle to contain water and adapted to be broken by a blow directed against the bottom of the can without however breaking the seal of the space between the cans substantially as described.

3. In a self-heating canned-goods tin, the combination of an inner receptacle for the goods and outer receptacle to inclose the same leaving an annular space around its sides and a cylindrical space below the bottom, means inclosed in the said cylindrical space adapted to generate heat when in contact with a liquid, a fragile liquid-containing receptacle mounted in the said cylindrical space in proximity to the bottom of the outer receptacle, and adapted to be broken by a blow directed against the said receptacle-bottom, without perforating the tin, a cover to air-tightly seal the said spaces against the interior of the inner receptacle, and a cover to the said interior receptacle and means for securing the same to enable it to be removed without breaking the seal of the spaces between the two receptacles, substantially as described.

In testimony whereof I affix my signature in the presence of two witnesses.

STEFAN GÁBRIEL.

Witnesses:
  JOSEPH WIEKMANN,
  EDMOND MOHIER.